United States Patent
Zhang et al.

(10) Patent No.: US 10,855,340 B2
(45) Date of Patent: *Dec. 1, 2020

(54) SYSTEM AND METHOD FOR NETWORK UPLINK MEASUREMENT BASED OPERATION USING UE CENTRIC SOUNDING

(71) Applicant: Huawei Technologies Co., Ltd., Shenzhen (CN)

(72) Inventors: Liqing Zhang, Ottawa (CA); Jianglei Ma, Ottawa (CA); Kelvin Kar Kin Au, Ottawa (CA); Nimal Gamini Senarath, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/710,599

(22) Filed: Dec. 11, 2019

(65) Prior Publication Data
US 2020/0119774 A1   Apr. 16, 2020

Related U.S. Application Data

(63) Continuation of application No. 15/918,769, filed on Mar. 12, 2018, now Pat. No. 10,511,351, which is a
(Continued)

(51) Int. Cl.
*H04B 7/024* (2017.01)
*H04B 7/0413* (2017.01)
(Continued)

(52) U.S. Cl.
CPC ........... *H04B 7/024* (2013.01); *H04B 7/0413* (2013.01); *H04B 7/0686* (2013.01);
(Continued)

(58) Field of Classification Search
CPC ..... H04W 24/00; H04W 40/24; H04W 40/32; H04L 43/50
See application file for complete search history.

(56) References Cited

U.S. PATENT DOCUMENTS

| 8,442,546 B2 | 5/2013 | Ofuji et al. |
| 2007/0153758 A1 | 7/2007 | Kang et al. |
| (Continued) | | |

FOREIGN PATENT DOCUMENTS

| CN | 101594633 A | 12/2009 |
| CN | 101959205 A | 1/2011 |
| (Continued) | | |

*Primary Examiner* — Afshawn M Towfighi
(74) *Attorney, Agent, or Firm* — Slater Matsil, LLP

(57) ABSTRACT

Embodiments are provided for uplink measurement based mechanism and control using user equipment (UE) centric sounding signals. The mechanism provides an alternative to DL-measurement dominated system control. Based on UL-measurements at TPs, the network obtains knowledge of users' channel and timing information, traffic, and interference, and is thus able to perform better control, including TP and UE clustering and optimization, and power control and link adaptation. In an embodiment method, a TP receives one-to-one mapping information indicating a plurality of UE IDs and a plurality of sounding channels assigned to the corresponding UE IDs. When the TP detects a sounding reference signal (SRS) from a UE, the TP is able to identify the UE using the detected SRS and the one-to-one mapping information. The TP then obtains measurement information for the identified UE, enabling better control and communications for uplink and downlink transmissions between multiple TPs and the UE.

15 Claims, 9 Drawing Sheets

Related U.S. Application Data continuation of application No. 15/274,660, filed on Sep. 23, 2016, now Pat. No. 9,973,243, which is a continuation of application No. 13/930,908, filed on Jun. 28, 2013, now Pat. No. 9,455,772.

(51) Int. Cl.
*H04B 7/06* (2006.01)
*H04L 5/00* (2006.01)
*H04W 24/08* (2009.01)

(52) U.S. Cl.
CPC ........... *H04L 5/0051* (2013.01); *H04W 24/08* (2013.01); *H04L 5/0035* (2013.01); *Y02D 30/70* (2020.08)

(56) References Cited

U.S. PATENT DOCUMENTS

| | | | |
|---|---|---|---|
| 2009/0028112 A1* | 1/2009 | Attar | H04W 36/245 370/332 |
| 2009/0233622 A1 | 9/2009 | Johnson | |
| 2011/0110357 A1* | 5/2011 | Chung | H04W 48/08 370/344 |
| 2011/0261716 A1 | 10/2011 | Kim et al. | |
| 2011/0274071 A1* | 11/2011 | Lee, II | H04B 7/0626 370/329 |
| 2011/0310818 A1 | 12/2011 | Lin et al. | |
| 2012/0120826 A1 | 5/2012 | Hao et al. | |
| 2012/0281654 A1 | 11/2012 | Aiba et al. | |
| 2012/0322484 A1 | 12/2012 | Yu et al. | |
| 2014/0302863 A1 | 10/2014 | Chen et al. | |
| 2015/0181546 A1* | 6/2015 | Freda | H04L 27/0014 370/336 |
| 2015/0208263 A1 | 7/2015 | Behravan et al. | |

FOREIGN PATENT DOCUMENTS

| | | |
|---|---|---|
| CN | 102457966 A | 5/2012 |
| CN | 103141140 B | 6/2013 |
| WO | 2011006421 A1 | 1/2011 |
| WO | 2012055229 A1 | 5/2012 |
| WO | 2012162997 A1 | 12/2012 |

\* cited by examiner

SYSTEM AND METHOD FOR NETWORK UPLINK MEASUREMENT BASED OPERATION USING UE CENTRIC SOUNDING

This patent application is a continuation of U.S. patent application Ser. No. 15/918,769, filed on Mar. 12, 2018 and entitled "System and Method for Network Uplink Measurement Based Operation Using UE Centric Sounding," which is a continuation of U.S. patent application Ser. No. 15/274,660, now U.S. Pat. No. 9,973,243, filed on Sep. 23, 2016 and entitled "System and Method for Network Uplink Measurement Based Operation Using UE Centric Sounding," which is a continuation of U.S. patent application Ser. No. 13/930,908, now U.S. Pat. No. 9,455,772, filed on Jun. 28, 2013 and entitled "System and Method for Network Uplink Measurement Based Operation Using UE Centric Sounding," all of which are hereby incorporated by reference herein as if reproduced in their entireties.

TECHNICAL FIELD

The present disclosure relates to the field of wireless communications, and, in particular embodiments, to a system and method for network uplink measurement based operation using UE-centric uplink sounding.

BACKGROUND

In current cellular or wireless technologies, the system controls are dominated by downlink (DL) measurements (UE measure and report). For example, the clustering or grouping of transmission points (TPs) for downlink (DL) and uplink (UL) transmissions is typically established based on user equipment (UE) measurements from DL reference signals, e.g., from each cell. This requires each cell to provide dedicated DL reference signals, which leads to complicated DL reference signal design and significant signaling overhead, and other issues for current or future wireless network technologies, such as in heterogeneous network (HetNet) where Pico cells may not provide reference signals. Further, using DL-based measurement, UL coordinated multi-point (CoMP) transmission may experience timing advance (the length of time a signal takes to reach TPs from a UE) issues within serving TPs. Another issue is that a dynamic (e.g., upon demand) TP optimization scheme requires frequent UE measurement and feedback, which is challenging for DL pilot design with more antennas. Moreover, the current UL sounding reference signal (SRS) is coupled with cell/TP identity and set up after TP clustering has been completed. Thus, mobile users have to change sounding signal configurations when switching cells. There is a need for a scheme to resolve or handle the issues above.

SUMMARY

In accordance with an embodiment, a method implemented at a transmission point (TP) for uplink measurement based operation and control in a wireless network using user equipment (UE) centric sounding signals includes receiving, from a network, one-to-one mapping information indicating a plurality of UE identities (IDs) and a plurality of sounding channels assigned to the corresponding UE IDs. The TP detects a sounding reference signal (SRS) from a UE. The SRS comprises one of sounding sequences assigned to the UE. The UE is then identified using the detected SRS and the one-to-one mapping information. Measurement information is then obtained for deciding a scheme for communications between multiple TPs and the identified UE for at least one of uplink and downlink transmissions.

In accordance with another embodiment, a network component supporting uplink measurement based operation and control in a wireless network using UE centric sounding signals includes at least one processor and a computer readable storage medium storing programming for execution by the at least one processor. The programming includes instructions to receive, from a network, one-to-one mapping information indicating a plurality of UE IDs and a plurality of sounding channels assigned to the corresponding UE IDs. The network component then detects a SRS from a UE. The SRS comprises one of sounding sequences assigned to the UE. The network component also identifies the UE using the detected SRS and the one-to-one mapping information, and hence obtains uplink measurement information for deciding a scheme for communications between multiple transmission points (TPs) and the UE for at least one of uplink and downlink transmissions.

In accordance with another embodiment, a method implemented by a UE for enabling uplink measurement based operation and control in a wireless network using UE centric sounding signals includes obtaining a mapping table that maps UE identity to a sounding channel. The method further includes sending in a network a SRS identifying the UE, and sending, to one or more TPs, information at UE for downlink (DL) system control including at least slow link adaptation (LA) or power control.

In accordance with another embodiment, a UE supporting uplink measurement based operation and control in a wireless network using UE centric sounding signals includes at least one processor and a computer readable storage medium storing programming for execution by the at least one processor. The programming including instructions to obtain a mapping table that maps UE identity to a sounding channel. The UE is also configured to send in a network a SRS identifying the UE, and further send, to one or more TPs, information at UE for DL system control including at least slow LA or power control.

In accordance with another embodiment, a method implemented by a network component for enabling uplink measurement based operation and control in a wireless network using UE centric sounding signals includes assigning a plurality of UE identities to a plurality of corresponding UEs. Each of the UE identities uniquely identifies a corresponding UE from the UEs. The method further includes generating a plurality of orthogonal sounding channels using the UE identities. Each of the orthogonal sounding channels is uniquely generated using a corresponding UE identity from the UE identities.

In accordance with another embodiment, a network component supporting uplink measurement based operation and control in a wireless network using UE centric sounding signals includes at least one processor and a computer readable storage medium storing programming for execution by the at least one processor. The programming including instructions to assign a plurality of UE identities to a plurality of corresponding UEs, where each of the UE identities uniquely identifies a corresponding UE from the UEs. The network component is further configured to generate a plurality of orthogonal sounding channels using the UE identities, where each of the orthogonal sounding channels is uniquely generated using a corresponding UE identity from the UE identities.

In accordance with another embodiment, a method implemented by a UE for enabling device-to-device (D2D) clustering in a wireless network using UE centric sounding signals includes receiving, at the UE from the network, one-to-one mapping information indicating a plurality of UE IDs and a plurality of sounding channels assigned to the corresponding UE IDs. The method further comprises detecting a SRS on an uplink transmission from a second UE from the UEs. The SRS comprises one sounding sequences assigned to the second UE. The method also includes identifying the second UE using the detected SRS and the one-to-one mapping information, and after receiving the SRS at the UE, communicating with one or more other UEs including the second UE, the network, or combinations thereof to establish D2D clustering for the UE and the second UE.

In accordance with yet another embodiment, a UE supporting D2D clustering in a wireless network using UE centric sounding signals. The UE comprises at least one processor and a computer readable storage medium storing programming for execution by the at least one processor. The programming including instructions to receive, at the UE from the network, one-to-one mapping information indicating a plurality of UE IDs and a plurality of sounding channels assigned to the corresponding UE IDs. The UE is further configured to detect a SRS on an uplink transmission from a second UE from the UEs. The SRS comprises one of sounding sequences assigned to the second UE. The UE then identifies the second UE using the detected SRS and the one-to-one mapping information. After receiving the SRS at the UE, the UE communicates with one or more other UEs including the second UE, the network, or combinations thereof to establish D2D clustering for the UE and the second UE.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
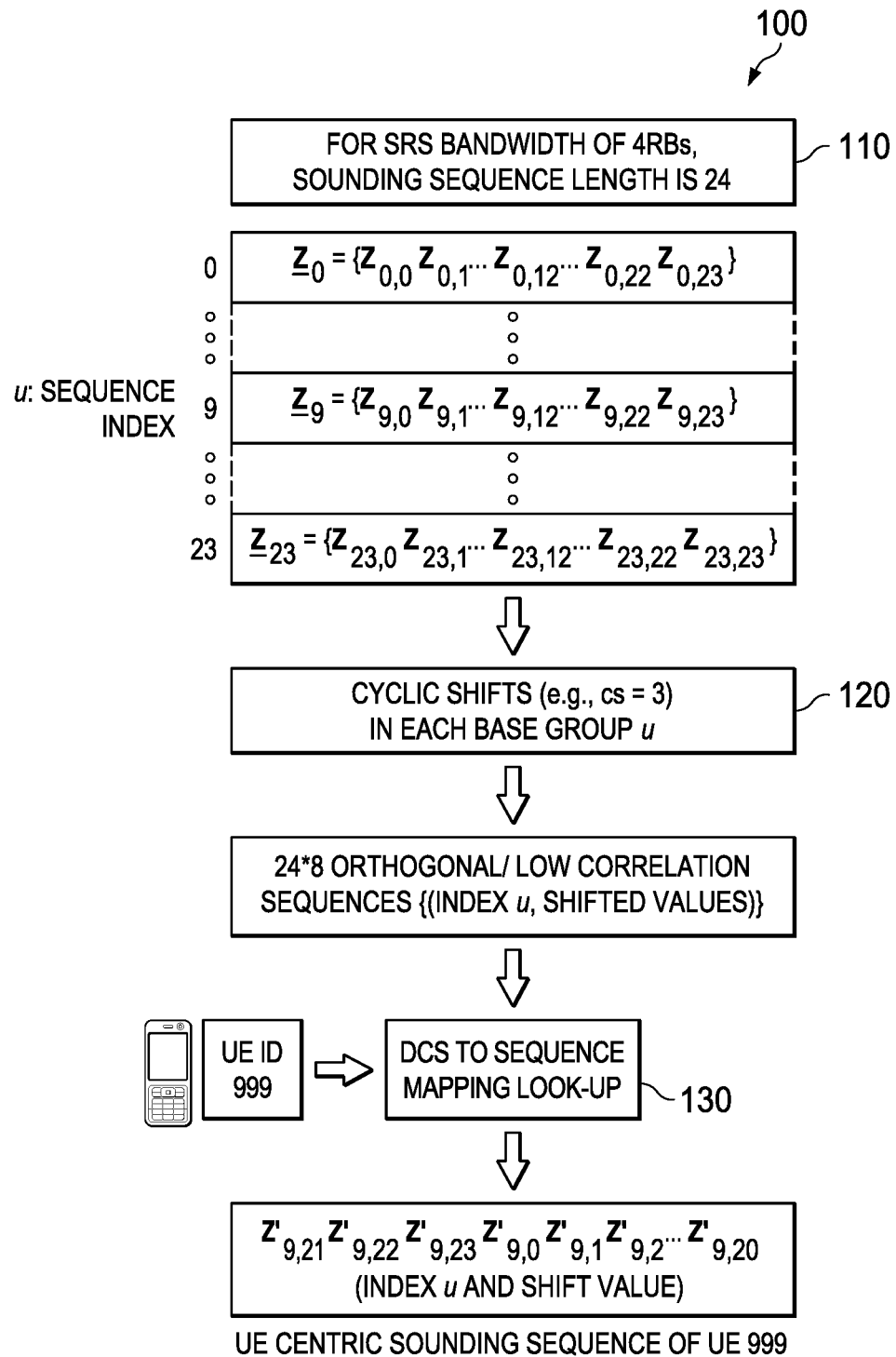
FIG. 1 illustrates an embodiment scheme for UE-centric SRS sequence generation.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

Current terminal device measurement based design may not efficiently support future radio access virtualization where there is no one-to-one association between transmit point and terminal device. Specifically, the device needs to know an index or ID of a TP in order to perform measurement based on DL reference signals. In addition, denser TP deployment is expected in future networks, supporting more terminal devices. Thus, there may be significant increase of DL-measurement reference signal overhead and terminal device report overhead.

To effectively solve at least some of the issues above associated with using DL-measurements for system control, an UL-measurement based system control scheme is provided herein using UE centric sounding schemes, as described below. The UE centric sounding mechanism herein provides an effective means to accurately measure the channels of individual users at TPs. As such, the UL-measurement based system control can be used to replace currently DL-measurement dominated system control. Based on UL-measurements at TPs, the network has knowledge of all users' channel and timing information (overall channel information), traffic, and interference. Given such information, the system is able to perform better control, including TP and UE clustering and optimization, and power control and link adaptation. For example, the system can use such information to accomplish decoupling of DL and UL TP clustering and dynamic TP clustering optimization.

Further, the UL-measurement system operation (for system control) using UE centric sounding is of TP virtualization, such as for implementing virtual radio access networks (VRANs). Specifically, once a terminal device signals itself or performs its UE centric sounding, the network can notify the device by the UL measurement and provides best services to the device from a suitably selected group of DL and UL TPs, which can be transparent to the terminal device. The network can obtain channel related information for all active terminal devices through TP measurement. For instance, a TP can monitor the devices within its service range and report the information to a central controller. The central controller then then able to dynamically optimize the transmission between different TPs and devices. The actual physical TP can be transparent to device, e.g., the device communicates with a group of TPs as a virtual TP unit to improve efficiency and performance.

Embodiments are provided herein for enabling TP clustering and optimization in wireless networks using UE-centric UL sounding signals. The sounding signals are also referred to herein as sounding channels or SRSs. A scheme, suitable for current wireless networks as well as future virtual radio access networks (VRANs), is provided to achieve DL/UL TP clustering decoupling and optimization using UL measurements. Specifically, the TP clustering and dynamic update is based on UL measurement. The UE-centric sounding scheme decouples UL SRS channels from any TP. The UL TP clustering takes advantage of measured timing advance (TA) values, which may avoid TA issues in UL CoMP transmission. The TP can measure the signal strength and TA information of a UE close to it (within a suitable proximity range). The scheme also allows dynamic changing of UL clustering. The UE centric sounding decouples sounding sequences from TPs by associating UE sounding sequence and opportunity (allocated transmission resource in time or frequency) with the UE itself, with a UE ID. UE sounding signals can be measured by all neighbor TPs and neighbor UEs. The UE-centric UL sounding scheme also enables device-to-device (D2D) clustering and optimization and effective power control. Some of the features and aspects of the scheme are described in detail below.

To implement UL measured based TP clustering and optimization, a UE starts UE-centric reference signals broadcasting, for example, after UE power on and entry to the network. During UE network entry, each UE can be assigned a dedicated connection sequence (e.g., of 16 bits) for fast network reentry or fast access from idle state. The surrounding TPs and neighbor UEs can then measure the sounding signal(s) from the UE. This may include using relatively long-term measurements and power differentiations among TPs and UEs. The measurements can then be used to decouple (by the network) DL and UL TP clustering and further optimize TP clustering for the UEs periodically or on demand. The signals from the UEs to the TPs may also include or used to calculate timing information. UL CoMP sets of UEs can be established based on UE timing information to different TPs. D2D clustering and optimization and power control can also be effectively established based on each UE's sounding signal.

The UE-centric UL sounding scheme uses UE-centric sounding sequence generation and channel opportunity. Specifically, the sounding signal or sequence from a UE is associated with that UE identity, for instance with a UE dedicated connection sequence (DCS), or any other UE ID that uniquely identifies a UE. A sufficiently large set of orthogonal sounding signals can be generated. Each UE can be assigned a unique and orthogonal sounding opportunity in an access area (e.g., a city or town area), which may be sufficiently large. For example, for a set of DCSs in an area, a one-to-one table can be established (by the network) to map each DCS to a unique sounding signal. The table can be distributed among the TPs in that area. The UE can provide periodic sounding signals (as assigned) with predefined patterns for transmission power. As described above, each TP (and neighbor UE) can search and measure neighbor UE sounding signals. The UE DCS search in a TP can be similar to UE search for pilots from different TPs, dividing UE into different sets. For instance, the different sets in each TP include an active UE set (e.g., of UEs in the neighborhood), a candidate UE set (e.g., with measurable SRS and relatively week received signals), and an undetectable UE set (e.g., of UEs that are not detectable at their sounding channels). For a TP, any of the UEs from the active set is able to provide information including UL signal strength and signal to interference plus noise ratio (SINR) at the TP and UE timing advance (TA) value. These UL measurements can be updated periodically. The above information may be reported by each TP to a centralized node/TP. As a result, the network has an overall picture and knowledge of channels, traffic scenarios and distributions of all users, and is able to perform better system control, for example, TP clustering, dynamic clustering update or optimization, and/or UL CoMP configuration. The UE TA value may also be used for UL CoMP setup. The TP clustering may be implemented as such without multiple Timing Advance Groups (TAGs) issues. Other control examples are the UL-measurement based power control and link adaptation.

FIG. 1 illustrates an embodiment scheme 100 for UE-centric SRS sequence generation. The scheme 100 generates a set of SRS sequences (bit sequences) for a plurality of UEs. The set includes a sufficiently large quantity of orthogonal sequences. At step 110, a set of base sequences constructed by cyclic extensions of the sequences, e.g., with the length of a maximum prime smaller than a sounding sequence length for SRS bandwidth. Alternatively, the sequences can be generated by a computer search for quadrature phase-shift keying (QPSK) based sequences in LTE for the SRS bandwidth (e.g., 4 RBs). A set of base sequences can be selected based on SRS resource per user. The UL SRS bandwidth can be 4 RBs, 8 RBs, or any other integer multiple of 4 of RBs. For example, using SRS resource of 4 RBs, the sounding sequence length is 24. The 24 base sequences may be selected from computer searched QPSK-based sequences. At step 120, for each base sequence, a set of cyclic shifted version sequences of the base sequence is generated. At step 130, a UE ID for each UE is mapped to a unique or corresponding sounding sequence. For example, table based mapping of UE ID is used to find the corresponding UE sequence. The mapping may also consider user mobility, e.g., whether the UE is mobile or static. Other means of mapping (e.g., with network assistance) can also be used.

The reference signal sequences may be reused among users with SRS derivation based on UE identity and pre-defined rules, e.g., UE dedicated sequence ID (e.g., 16 bits) obtained using modulo operation over resources. Each UE ID is mapped to choosing a sounding sequence, generated by one of the base reference signal sequences that is applied with a cyclic shift and an orthogonal code (OC). A combination type of odd or even resource elements (REs) within one RB is used for different SRS opportunities. Time-domain or frequency-domain mapping can be used. The combinations of the above orthogonal factors provide a substantially large orthogonal set of sounding opportunities for users to map and select from. Further, SRS channel orientation (configuration options) may be predefined or indicated via network broadcast. Using predefined SRS channel orientation may not require network signaling, while network broadcast may require radio resource control (RRC) or other signaling.

Figure 2:
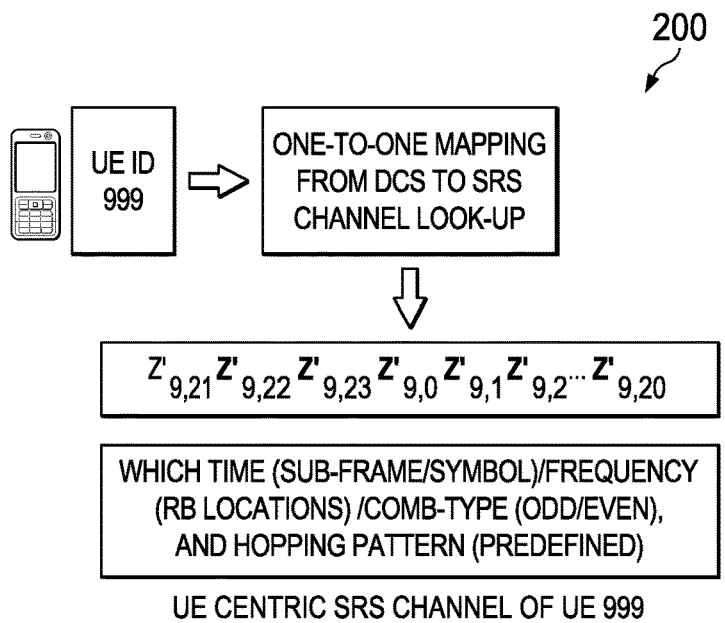
FIG. 2 illustrates an embodiment scheme for UE-centric SRS channel selection.

FIG. 2 illustrates an embodiment scheme 200 for UE-centric SRS channel selection. A UE can use a SRS channel comprising one sounding sequence and a UE-centric sounding configuration. For example, the UE-centric sounding configuration can include a combination type of odd or even REs for one RB, time-domain configuration, SRS bandwidth resources, and/or periodicity with a hopping pattern. The resulting UE centric SRS channels for different UEs are unique from each other. This enables a one-to-one mapping from DCS to SRS channel in a relatively large access area, such as a small city or downtown area in a large city. For example, using a UE ID of 16 bits, 65K (65000) identities (DCSs) can be represented. A network orientation of 4 RBs SRS is also used, with 20 millisecond (ms) periodicity for 10 MHz. The SRS locations are 20(sub-frame)×12(4 RBs resource)×2(comb-type). The number of SRS sequences is 24×8, and hence the total number of sounding sequences in the area is 20×12×2×24×8=92K, which is greater than 65K. UE DCS to sounding mapping can be established in a predefined one-to-one mapping table. Low mobile users may experience substantially small chances of switching sounding sequences when moving across borders. The sounding switching rate (SWR) can be equal to the DCS switching rate using the table-lookup one-to-one mapping.

The UE-centric UL sounding scheme can also include UL sounding management. Area based sounding resources are used based on independent sounding signal sets. Network-assistant management of sounding resources is also used to reduce the search speed and implementation complexity. For mobility management, different strategies for static and mobile users can be used. The SRS channel mapping for mobile users is separated from static users. For instance, static users may take and reuse a smaller portion of the sounding resources. Intelligent sounding channel switching can also be implemented for mobile users on demand. This may include using enhanced schemes to reduce or eliminate DCS switching rate. Intelligent sequence management strategy can also be part of mobility management. The sounding chances or opportunities can be larger than the number of DCS sequences.

Figure 3:
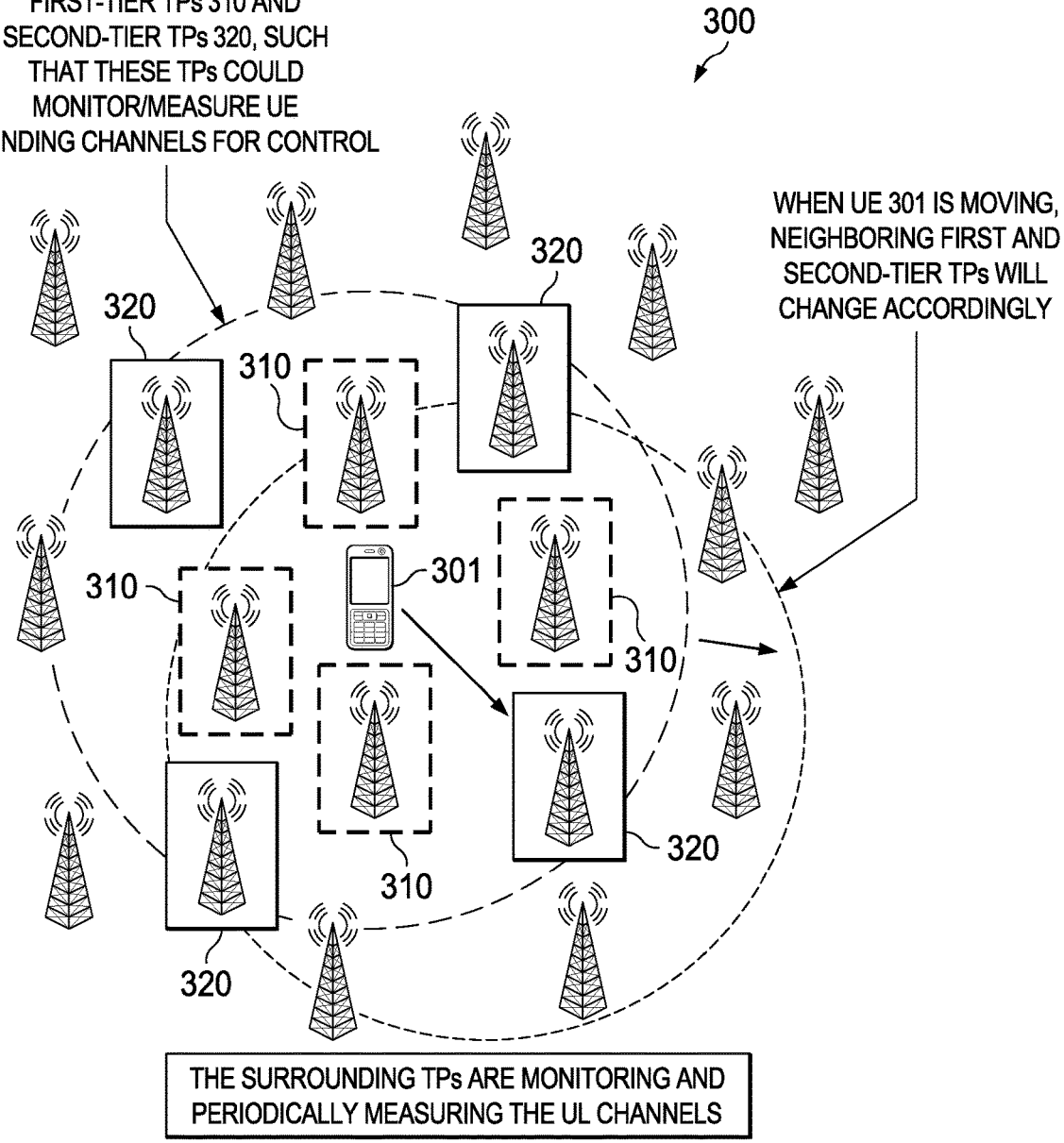
FIG. 3 illustrates an embodiment scheme for UL measurement with UE-centric UL SRS with UE mobility.

FIG. 3 illustrates an embodiment scheme 300 for UL measurement with UE-centric UL SRS. The scheme 300 may be based on TP-centric sounding search without network assistance. For instance, for a given access area, each TP can search and identify UEs (e.g., DCSs) with three UE sets and different update rules. The sets include an active set for serving neighbor UEs. This set may be update UL measurements most frequently in comparison to other sets. Another set is a candidate set for detectable but relatively weak signal UEs. This set may update UL measurements frequently. The third set is an undetectable set, which updates measurements less frequently. The update on the undetectable set may take some time, e.g., to search a large number of UEs/DCSs by trying their SRS channels. This can be improved with network assistance by exchanging UE registration/entry information in the neighborhood TPs. For example, a mobile UE 301 can be monitored by its neighbor TPs via constant UL measurements on its SRS channel. The UE ID may be notified to neighboring first-tier TPs 310 and second-tier TPs 320. These TPs monitor/measure UE sounding channels for control. When UE 301 is moving, the neighboring first-tier TPs 310 and second-tier TPs 320 change accordingly (as shown by the dashed and dotted circles in FIG. 3). The UE surrounding TPs are monitoring and periodically measuring the UL channels.

In some scenarios, the scheme 300 can reduce search space with network assistance, e.g., in addition to TP-centric sounding search. The network may have knowledge of UE entry and registration. Thus, the neighboring TPs can get notified of each UE entry. As part of mobility management, the serving cells can notify the neighboring first-tier TPs 310 and the second-tier TPs 320 of UE 301 existence. When network entry is done, UE SRS channel is measured by its neighbor TPs. Each TP can derive the UE sounding sequence and channel. Thus, neighboring TPs are able to monitor/measure a UE and its mobility. A TP can then categorize a UE into one of the measurement sets. As such, neighboring or detectable UEs can be monitored more quickly and effectively, including mobile or moving UEs. The network assistance can also significantly reduce the search time of UEs of interest in addition to facilitating monitoring/measuring a UE and its mobility. D2D communications (between UEs) can be used to enable any UE to search and measure the existence of UEs in its neighborhood area. D2D clustering is facilitated with UE-centric sounding, and can be more feasible with assistance from the network.

As described above, unique sounding sequence and orthogonal opportunity can be guaranteed for each UE when assigning DCS to it during UE initial entry. The number of orthogonal sounding chances (OSCs) can be larger than the number of access sequences (e.g., equal to $2^{16}$). For example, using a UE ID of 16 bits, 65K access sequences can be generated. Using the SRS locations: 20(sub-frame) *12(4 RBs resource)*2(comb-type), and the SRS sequences: 24 (base)*8(shift)*2(OC in time), the total OSCs in the network is 184320 which is greater than 65K access sequences. This is sufficient to implement UE DCS to OSC one-to-one mapping (e.g., using table-lookup).

Figure 4:
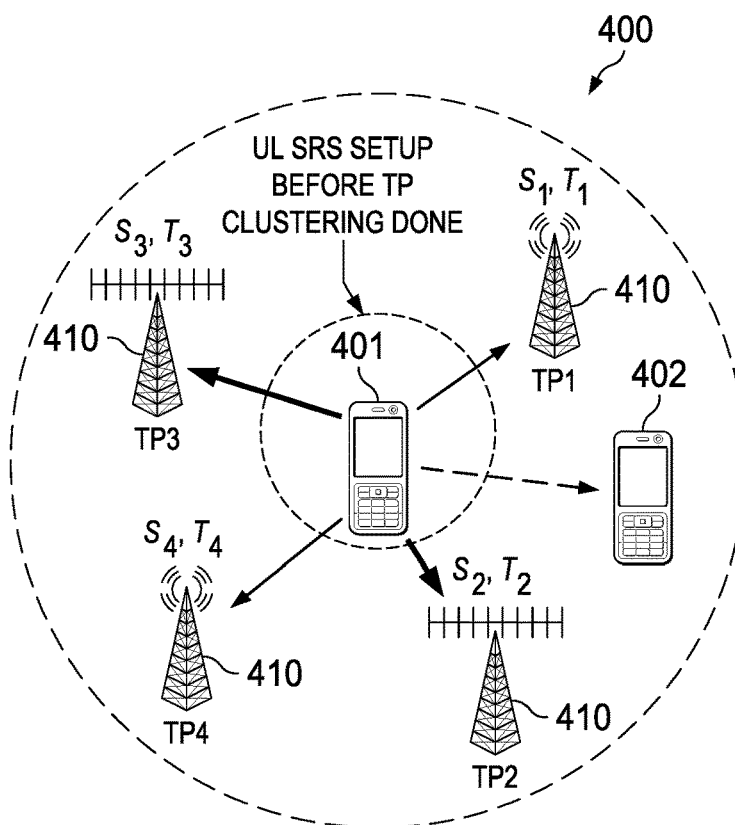
FIG. 4 illustrates an embodiment of a UE-centric sounding and UL measurement scheme.

FIG. 4 shows an embodiment of a UE-centric sounding scheme 400, where a UE 401 sends sounding signals to neighboring TPs 410. The TPs 410 can measure the UE UL sounding channels, e.g., even if the neighboring TE is not part of a CoMP setup. For example all neighboring TPs 410 within a neighbor area, TP1, TP2, TP3, and TP4 receive and measure corresponding UE channels S1/T1, S2/T2, S3/T3, and S4/T4 respectively. UL/DL TP clustering optimization, as well as slow link adaptation (LA) and power control, can then be implemented using the corresponding (distinct) measurements by each TP 410 from each UE 401. Specifically, the SRS setup is done, as described above, before TP clustering, and the SRS signals are then used for clustering and optimization. The clustering optimization can provide LA and power control. The UE sounding power headroom can be reported in initial entry to serving TPs. The power adjustment is also possible upon demand, e.g., after UE entry. The scheme 400 may be used to setup virtual RANs (V-RANs). Similarly, a capable neighboring UE 402 can also receive and measure a SRS channel from the UE 401 for D2D clustering, LA setup, and cooperation.

Figure 5:
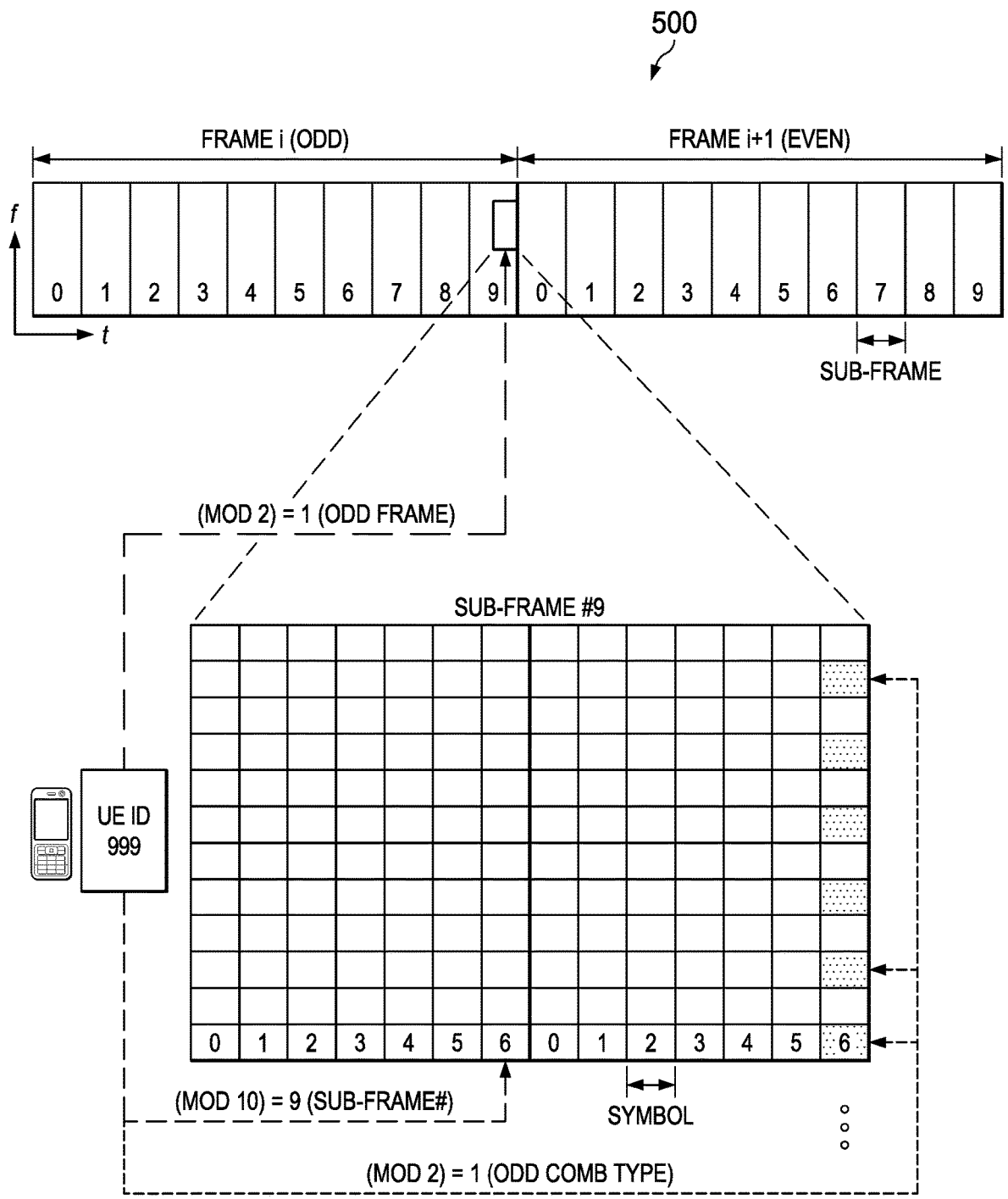
FIG. 5 illustrates an embodiment of a UE SRS opportunity mapping scheme.

FIG. 5 shows an embodiment of a scheme 500 for UE SRS opportunity mapping. A time-domain mapping of UE ID to a frame/sub-frame/symbol can be used. The UEs may share the sounding resources among x (e.g., 2) frames with every y (e.g., 1) sub-frame(s) and sounding symbol location(s) (e.g., last symbol), where x and y are integers. Alternatively, a frequency-domain mapping of UE ID to an index on the SRS resources can be used. For a given symbol, the UEs share the system bandwidth. Depending on configured SRS bandwidth (e.g., 4 RBs for 10 MHz), multiple SRS resources (e.g., index 0~11) may be used by UEs. A combination type can also be considered for the mapping. For each SRS resource, a UE may choose one combination type, for example either odd REs or even REs in each RB. Further, the mapping may consider whether a UE is static or mobile. For instance, one option is to map static and mobile users to different sets of SRS opportunities.

Figure 6:
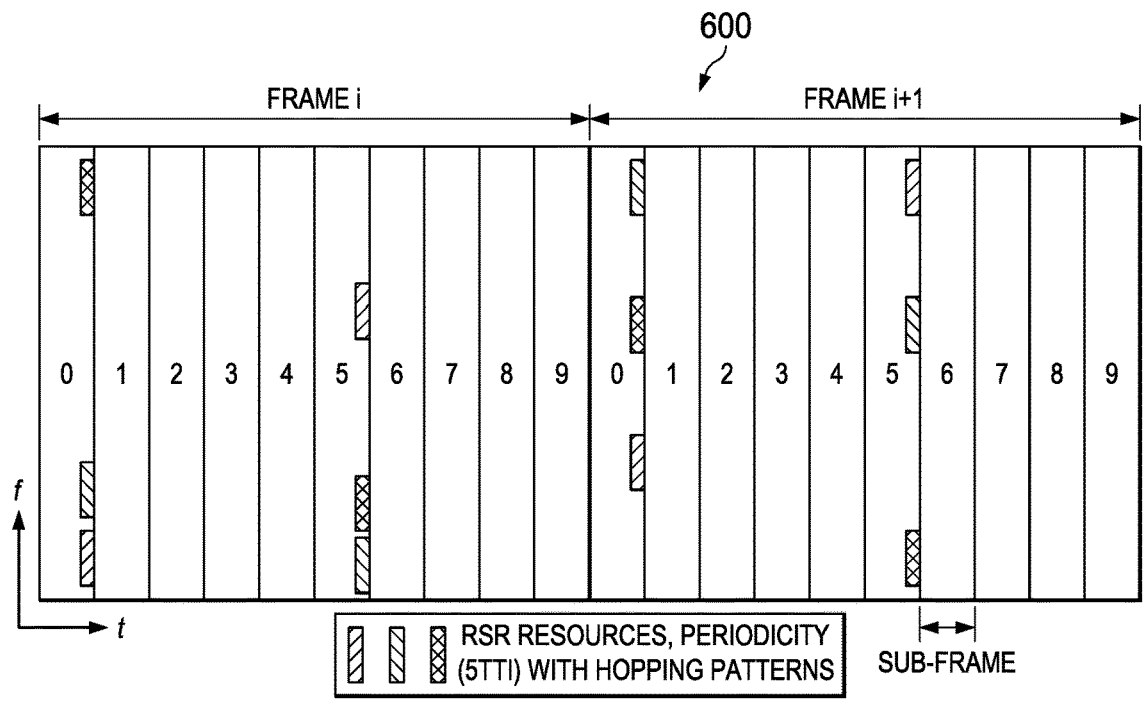
FIG. 6 illustrate an embodiment of SRS orientations considered for UE sounding.

FIG. 6 shows an embodiment of SRS orientations 600 that may be considered for UE sounding. Using predefined sounding signal orientations or configuration options to select or configure SRS for a UE is beneficial since it does not require signaling by the network. A SRS bandwidth is predefined, e.g., of 4 RBs, 8 RBs, or any integer n multiple of 4 RBs. Thus, the sounding sequence length is 24, 48, or n×24, respectively. The periodicity of the signals is also predefined, e.g., at 10 ms or once every frame. The hopping pattern can be predefined in accordance with periodicity and SRS resources. The periodicity and hopping patterns can be designed separately for static and mobile users. For instance, a static UE can be configured with a longer periodicity. Alternatively, network broadcast can be used for SRS orientations, which may require RRC or other suitable signaling. Tabulated SRS channel orientations may be broadcasted for a combination of SRS resources, periodicity, and hopping patterns. An orientation table index may be broadcasted in the network instead of signaling entire table information to reduce signaling load. For network management, the combinations of SRS bandwidths, periodicities, and hopping patterns may need to maintain UE SRS integrity during mobility (e.g., to keep a configured orientation for a UE moving across the network).

Figure 7:
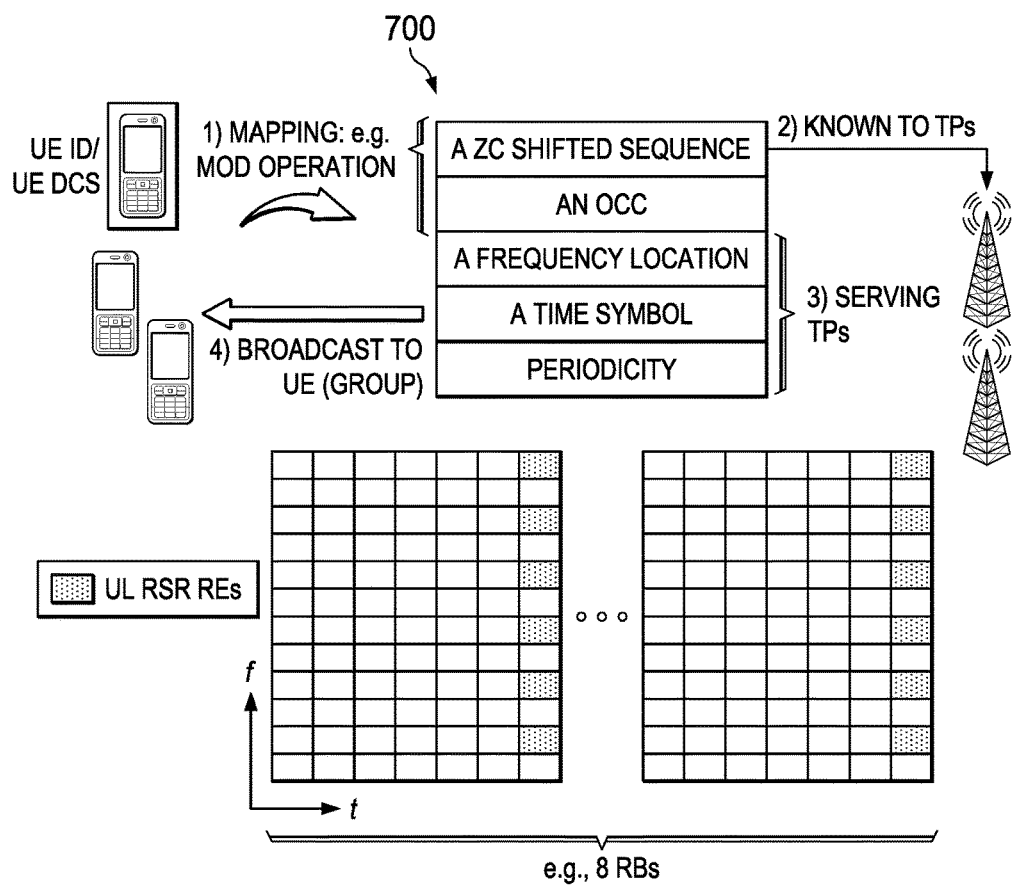
FIG. 7 illustrates an embodiment of a network work process with a UE-centric sounding.

FIG. 7 shows another embodiment of a UE-centric sounding operation process 700. In the scheme 700, each UE sounding reference signal is comprised of one ZC sequence and one OCC. For a given sounding bandwidth (configured from network or predefined), the ZC base sequence and cyclic shift can be obtained by UE ID/DCS mapping. One of (e.g., 2) OCC sequences and SRS locations in the frame and periodicity can be also obtained by UE ID/DCS modulo to get orthogonal SRS. The time, frequency, and periodicity are configurable. Alternative to the operation mode of mapping UE ID to these resources, direct one-to-one mapping from UE ID (DCS) to one sounding channel (e.g., a set of the resources) can be done. This can guarantee the UE SRS's orthogonality. Each TP broadcasts this information (e.g., the mapping table) to the detected UE and its UE group. The UE group can then measure this UE channel for D2D operation. In one scenario, resources per UE per symbol can be 8 RBs with combination type RE patterns. As such, with 10 MHz bandwidth and periodicity of 20 ms, the serving TPs can support 92160 (20×6×2×24×8×2) UEs for periodic sounding.

Figure 8:
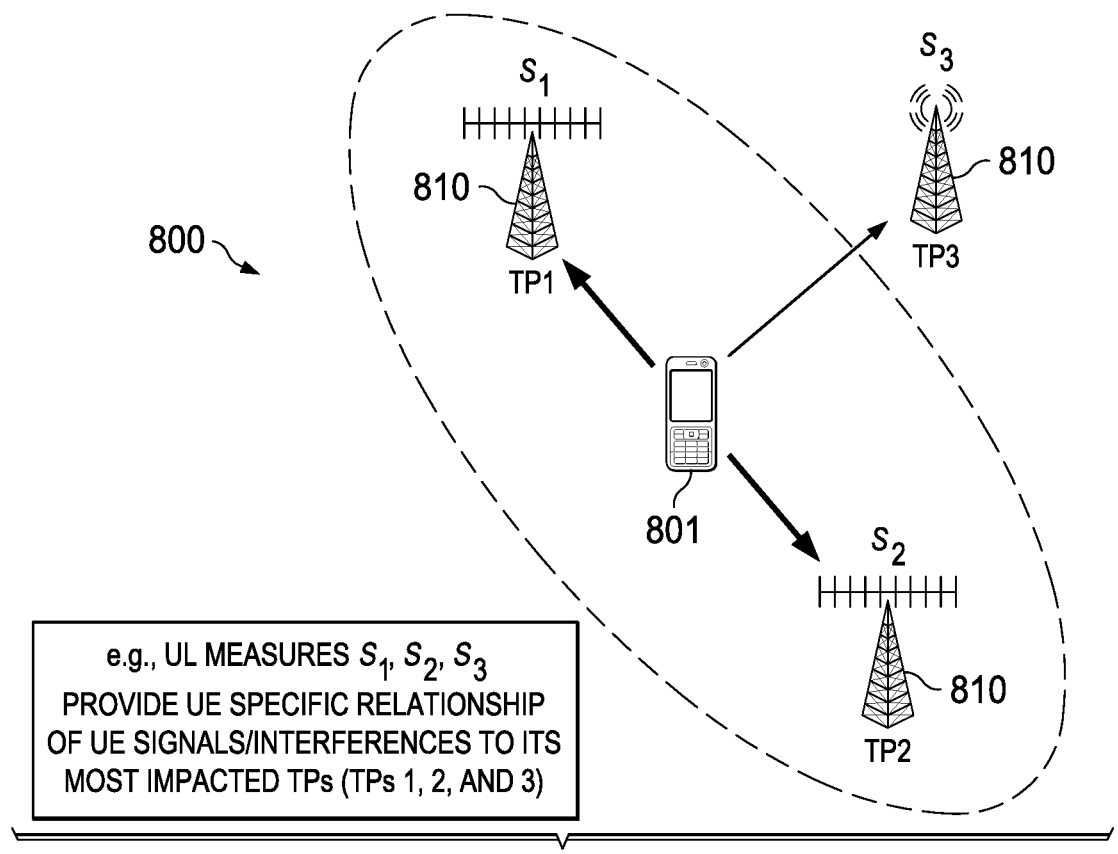
FIG. 8 illustrates an embodiment scheme for UL power control.

FIG. 8 shows an embodiment 800 scheme for UL power control. The UL signals from a UE 801 can be measured/perceived by surrounding TPs 810. The measurements may start initially on random access signals from the UE 801, and subsequently on SRS/data channels/DCS. The specific relationship between signals/interferences to the neighboring or close by TPs 810 (e.g., signals S1, S2 and S3 to TP1, TP2, and TPs respectively) can be obtained and used for more accurate power control and scheduling. The scheme 800 allows UL power control for CoMP transmission. For given serving TPs 810 (e.g., TP1 and TP2), joint power decision is made among the TPs 810 to achieve two targets: desired SINR and interference limit to strong interfered TPs. Power control and scheduling can be combined to minimize the interference variations for the neighbor TPs 810 to enhance the LA for the UE 801. Power control can be further optimized jointly with TP optimization (e.g., including intercell interference coordination (ICIC)) and scheduling. For example, if a strong interferer is not scheduled at certain time, it can impact the TP optimization and scheduling on other UEs.

The scheme 800 also allows power control for a cooperative UE group. The power control considers, for a UE, the signal/interference level to the other UEs in the D2D user group (additional power control constraint). Measurements on SRS from the other UEs can help determine the power level for the UE under consideration. In one implementation, a feasible power control scheme includes using history UL measurements and signal/interference relationship to get optimized power levels under different scenarios (e.g., for scheduling, TP group) offline. Best fit UE measurements are used to achieve desired targets.

Figure 9:
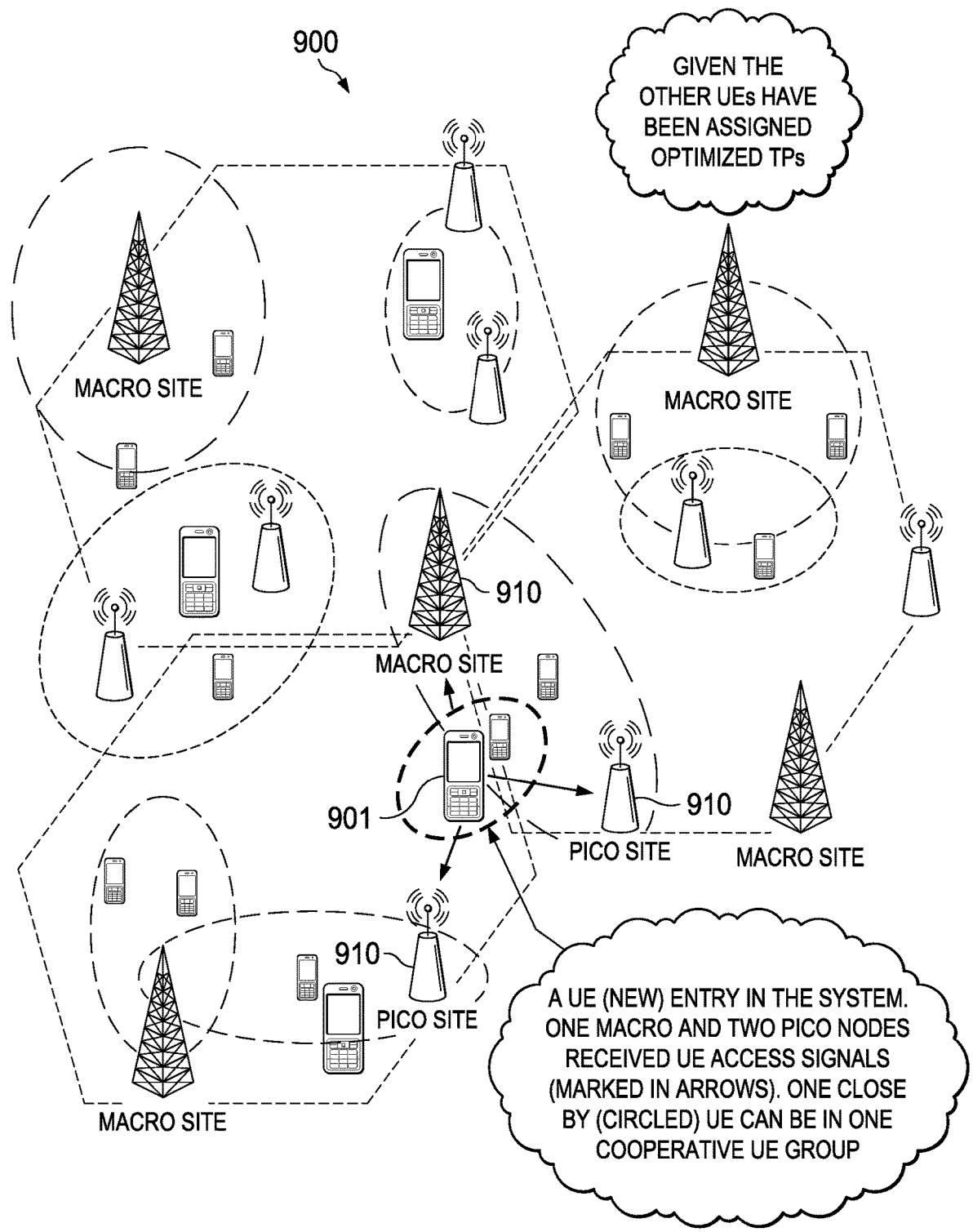
FIG. 9 illustrates an embodiment scheme for TP optimization and UE grouping.

FIG. 9 shows an embodiment scheme 900 for TP optimization and UE grouping. During a UE's 901 network entry, a plurality of TPs 910 can measure the UE's 901 initial access signals. The TPs 910 can estimate autocorrelation of channel measurements to obtain signal strengths to different TPs. For instance, DL reference signal receive power (RSRP) signals to the UE 901 from the TPs 910 can be estimated by a DL/UL power offset (e.g., using reported UE power headroom). TP optimization for the UE 901 includes decoupling DL and UL serving TPs 910 for the UE 901. The TP optimization process may use ICIC analysis, e.g., by the TPs 910 and/or network. The TP optimization may be based on optimization criteria, e.g., maximizing overall network throughput. One option is using an offline optimized database to map measurement inputs to find a best set of TPs 910.

For mobile UEs, serving TPs 910 can be changed. The TPs may periodically or continuously detect UL measurements on UL SRS from nearby UEs including moving UEs. In idle mode, UL measurements on periodic DCS access signals can be used for location update. Further, UE coordination can be used for grouping UEs for D2D service. UL grouping can be based on UL measurement vectors from different TPs. UE channel correlations and relative locations can be readily obtained. The grouping may be jointly considered with TP optimization.

Figure 10:
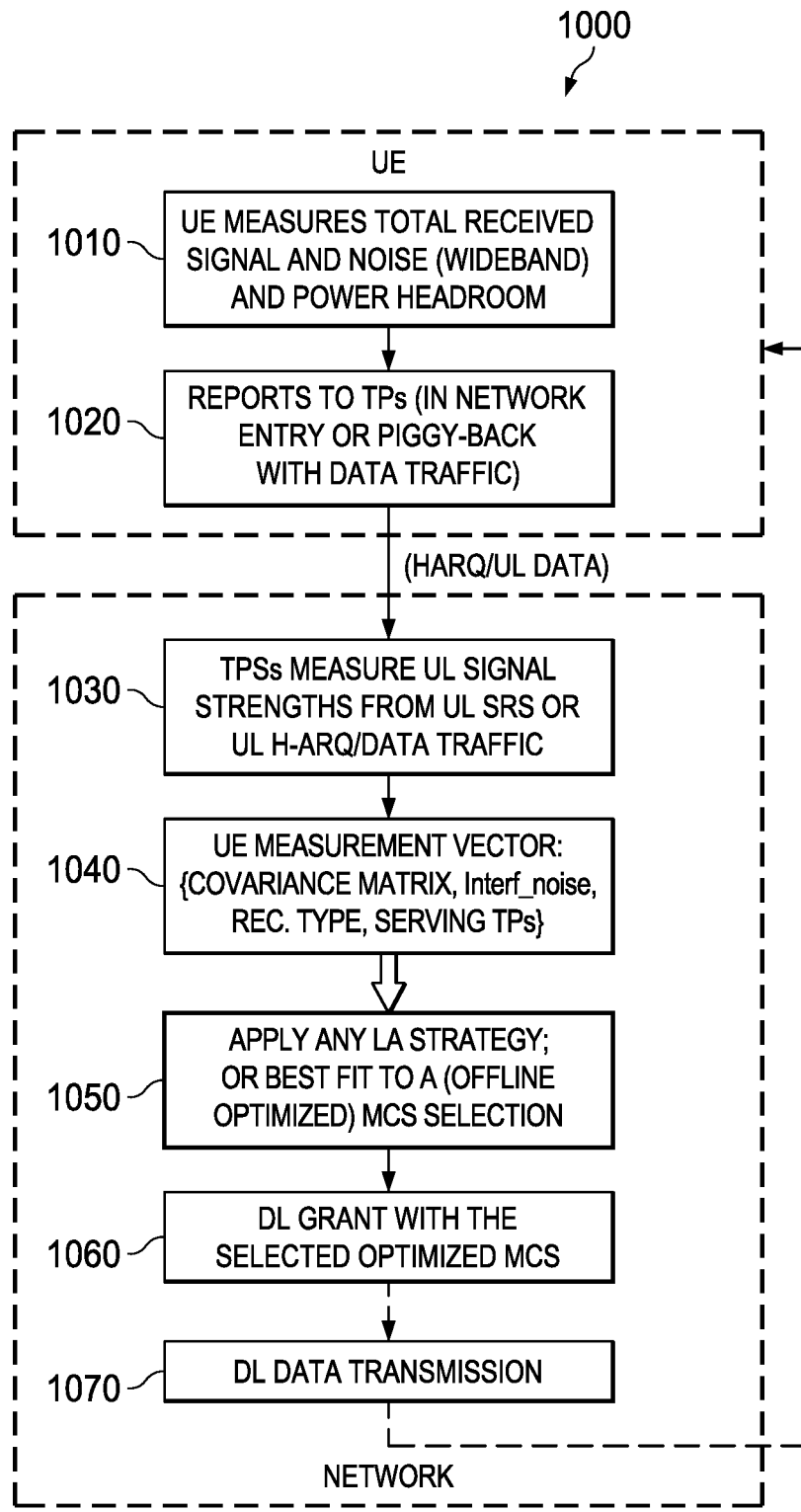
FIG. 10 illustrates an embodiment scheme for slow link adaptation for DL.

FIG. 10 shows an embodiment scheme 1000 for slow link adaptation for DL. At step 1010, a UE measures total received signal and noise, and estimates power headroom based on open loop power control. At step 1020, the UE reports to one or more TPs, e.g., upon network entry or with data traffic, its perceived overall interference plus noise level, and the power headroom. The TPs keep the UL measurements of the UE. The measurements may be received by the TPs using UE UL SRS signal periodically or UL data traffic/ACK/NACK signals for hybrid automatic repeat request (hybrid ARQ or HARQ). Alternatively, the measurements are received using UL periodic random access signals for location update in idle mode.

At step 1030, each receiving TP or the network measures UL signal strengths from UL SRS or UL HARQ/data traffic. At step 1040, the TP also estimates DL second-order channel statistics. A covariance channel matrix can be estimated for DL from UL measurement second-order statistics. Thus, reciprocity of DL and UL long-term channels for frequency-division duplexing (FDD)/time-division duplexing (TDD) may be maintained. A TP can generate a UE measurement vector comprising covariance matrix, interference noise, receiver type, and serving TPs information. At step 1050, the TP(s) or network applies any suitable LA strategy or a best fit modulation and coding scheme (MCS) selection, e.g., offline optimized MCS selection. The TP may adapt a MCS to UE DL channel state information. An optimization criterion may be applied to find best MCS based on UE DL channel state information (CSI), background interference and noise, receiver type, and/or serving TPs. An example of optimization criterion is maximizing data rate for a scheduled transmit data block. One option is to apply offline optimization data by best fitting of MCS with UE measurement inputs. At step 1060, the TP(s) or the network grant DL resources to the UE with the selected optimized MCS. At step 1070, the TP(s) begin DL data transmission(s) to the UE.

Figure 11:
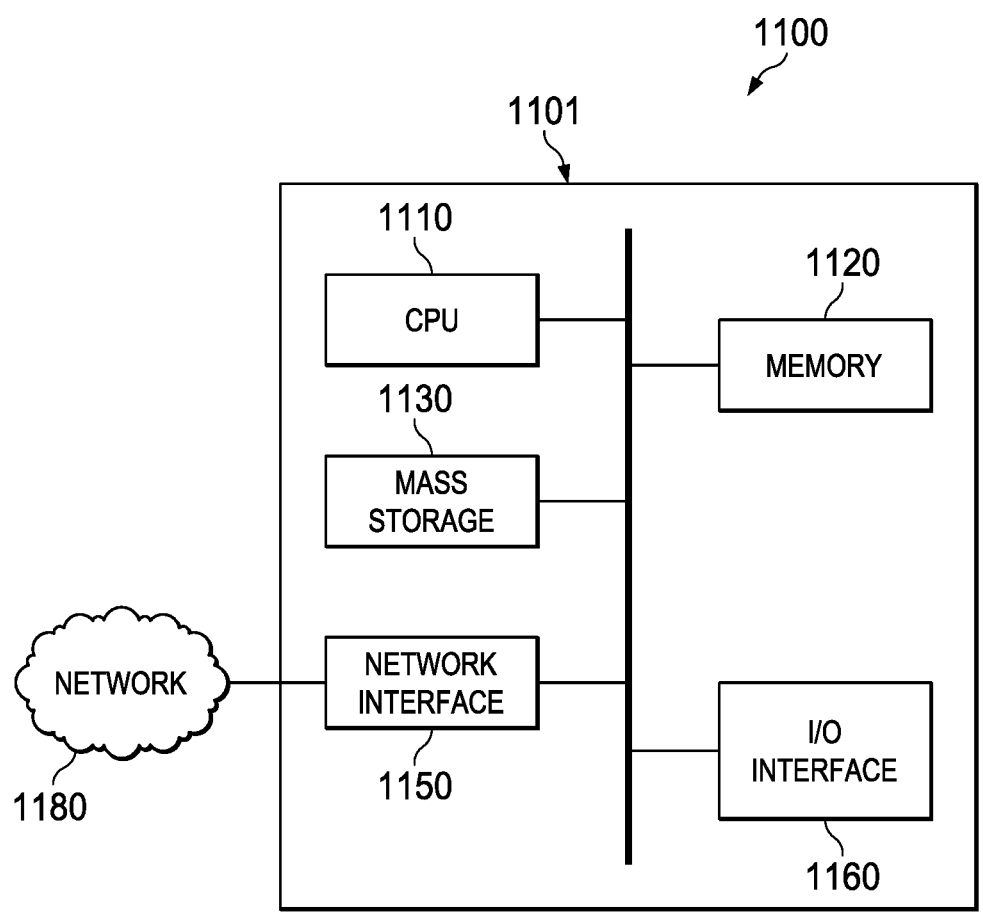
FIG. 11 is a diagram of a processing system that can be used to implement various embodiments.

FIG. 11 is a block diagram of an exemplary processing system 1100 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 1100 may comprise a processing unit 1101 equipped with one or more input/output devices, such as a network interfaces, storage interfaces, and the like. The processing unit 1101 may include a central processing unit (CPU) 1110, a memory 1120, a mass storage device 1130, and an I/O interface 1160 connected to a bus. The bus may be one or more of any type of several bus architectures including a memory bus or memory controller, a peripheral bus or the like.

The CPU 1110 may comprise any type of electronic data processor. The memory 1120 may comprise any type of system memory such as static random access memory (SRAM), dynamic random access memory (DRAM), synchronous DRAM (SDRAM), read-only memory (ROM), a combination thereof, or the like. In an embodiment, the memory 1120 may include ROM for use at boot-up, and DRAM for program and data storage for use while executing programs. In embodiments, the memory 1120 is non-transitory. The mass storage device 1130 may comprise any type of storage device configured to store data, programs, and other information and to make the data, programs, and other information accessible via the bus. The mass storage device 1130 may comprise, for example, one or more of a solid state drive, hard disk drive, a magnetic disk drive, an optical disk drive, or the like.

The processing unit 1101 also includes one or more network interfaces 1150, which may comprise wired links, such as an Ethernet cable or the like, and/or wireless links to access nodes or one or more networks 1180. The network interface 1150 allows the processing unit 1101 to communicate with remote units via the networks 1180. For example, the network interface 1150 may provide wireless communication via one or more transmitters/transmit antennas and one or more receivers/receive antennas. In an embodiment, the processing unit 1101 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Aspects of this disclosure provide a method for clustering, comprising receiving, by a central controller, two or more uplink sounding reference signal (SRS) measurements associated with a user equipment (UE) from two or more neighboring transmit points (TPs), the two or more uplink SRS measurements including at least a first uplink SRS measurement of a uplink SRS of the UE and a second uplink SRS measurement of the uplink SRS of the UE, the first uplink SRS measurement being taken by a different neighboring TP than the uplink second SRS measurement; and determining, by the central controller, a scheme for communications between one or more TPs with the UE based on the two or more SRS measurements. The method may further comprise establishing, by the central controller, a group of TPs that serve as a virtual TP or virtual radio access network (VRAN) for the UE, wherein each of the individual TPs in the group is transparent to the UE. The method may further comprise determining, by the central controller, a scheme, which may include determining, by the central controller, the one or more TPs to serve the UE based on at least one of: a TP clustering, TP clustering update, TP clustering optimization, transmission power control or link adaptation. The TP clustering may include uplink TP clustering for uplink signals from the UE and downlink TP clustering for downlink signals to the UE, and wherein the uplink TP clustering and the downlink TP clustering are established separately and independent from one another. The TP clustering may include uplink coordinated multipoint (CoMP) configuration using timing advance value from the UE. The uplink SRS may be used to uniquely identify the UE by TPs in a network area, and the uplink SRS may be independent of any of the TPs in the network area.

Embodiments provide a method comprising receiving, by a first neighboring transmit point (TP), a sounding reference signal (SRS) transmission from a user equipment (UE), sending, by the first neighboring TP, a first SRS measurement of the SRS transmission to a central controller, and receiving a TP clustering assignment from the central controller, the TP clustering assignment being based on at least the first SRS measurement and a second SRS measurement, wherein the second SRS measurement is based on the SRS transmission from the UE and is taken by a second neighboring TP that is different than the first neighboring TP. The method may further include transmitting a serving data transmission to the UE. The serving data transmission may be part of a joint transmission. The method may further include receiving a serving data transmission from the UE.

Aspects of this disclosure provide a method for uplink measurement based operation and control in a wireless network using user equipment (UE) centric sounding signals, the method comprising: receiving, from a network, one-to-one mapping information indicating a plurality of UE identities (IDs) and a plurality of sounding channels assigned to the corresponding UE IDs; detecting a sounding reference signal (SRS) from a UE, the SRS comprising one of sounding sequences assigned to the UE; identifying the UE using the detected SRS and the one-to-one mapping information; and obtaining measurement information for deciding a scheme for communications between multiple TPs and the UE for at least one of uplink and downlink transmissions. The method further comprises applying transmission power control, link adaptation, or both for the UE using the measurement information. The method further comprises communicating with one or more other TPs, the network, or combinations thereof to establish a group of TPs that serve as a virtual TP or virtual radio access network (VRAN) for the UE, wherein each of the individual TPs in the group is transparent to the UE. The method further comprises communicating with one or more other TPs, the network, or combinations thereof to establish TP clustering to serve the UE cooperatively, the TP clustering established using the measurement information, wherein the TP clustering includes uplink TP clustering for uplink signals from the UE and downlink TP clustering for downlink signals to the UE, and wherein the uplink TP clustering and the downlink TP clustering are established separately and independent from one another. The method further comprises reporting the measurement information to the network or a dedicated network node to receive TP clustering, clustering update, or clustering optimization, wherein the TP clustering includes uplink coordinated multi-point (CoMP) configuration using timing advance value from the UE. The method further comprises measuring a strength of the SRS; and according to the measured strength of the SRS, classifying the UE in an active UE set of neighborhood UEs, a candidate UE set of UEs with relatively weak signals, or an undetectable UE set of UEs with undetectable SRS.

Embodiments provide a network component supporting uplink measurement based operation and control in a wireless network using user equipment (UE) centric sounding signals, the network component comprising: at least one processor; and a computer readable storage medium storing programming for execution by the at least one processor, the programming including instructions to: receive, from a network, one-to-one mapping information indicating a plurality of UE identities (IDs) and a plurality of sounding channels assigned to the corresponding UE IDs; detect a sounding reference signal (SRS) from a UE, the SRS comprising one of sounding sequences assigned to the UE; identify the UE using the detected SRS and the one-to-one mapping information; and obtain uplink measurement information for deciding a scheme for communications between multiple transmission points (TPs) and the UE for at least one of uplink and downlink transmissions. Wherein the programming includes further instructions to apply transmission power control, link adaptation, or both for the UE using the uplink measurement information. Wherein the programming includes further instructions to communicate with one or more transmission points (TPs), the network, or combinations thereof to establish a group of TPs that serve as a virtual TP or virtual radio access network (VRAN) for the UE, wherein each of the individual TPs in the group is transparent to the UE, wherein the programming includes further instructions to communicate with one or more transmission points (TPs), the network, or combinations thereof to establish TP clustering to serve the UE, the TP clustering established using the uplink measurement information.

Embodiments provide a method for enabling uplink measurement based operation and control in a wireless network using UE centric sounding signals, the method comprising: obtaining a mapping table that maps UE identity to a sounding channel; sending in a network a sounding reference signal (SRS) identifying the UE; and sending, to one or more TPs, information at UE for downlink (DL) system control including at least slow link adaptation (LA) or power control, wherein the SRS is broadcasted upon entry of the UE in the network, wherein the SRS is broadcasted periodically in the network, and wherein the information at the UE includes at least measurement information, including DL interference plus noise, or UE power headroom during initial system entry to the network. Wherein the SRS is sent while the UE is mobile.

Embodiments provide a user equipment (UE) supporting uplink measurement based operation and control in a wireless network using UE centric sounding signals, the UE comprising: at least one processor; and a computer readable storage medium storing programming for execution by the at least one processor, the programming including instructions to: obtain a mapping table that maps UE identity to a sounding channel; send in a network a sounding reference signal (SRS) identifying the UE; and send, to one or more TPs, information at UE for downlink (DL) system control including at least slow link adaptation (LA) or power control. Wherein the UE is a mobile UE on the move in the network.

Embodiments provide at a network component, a method for enabling uplink measurement based operation and control in a wireless network using user equipment (UE) centric sounding signals, the method comprising: assigning a plurality of UE identities to a plurality of corresponding UEs, the UE identities each uniquely identifying a corresponding UE from the UEs; and generating a plurality of orthogonal sounding channels using the UE identities, the orthogonal sounding channels each uniquely generated using a corresponding UE identity from the UE identities The method further comprises maintaining a one-to-one mapping between each of the sounding channels and the corresponding UE identities. The method of further comprises distributing the one-to-one mapping to a plurality of transmission points (TPs) in a network to enable the TPs to detect the orthogonal sounding channels from the UEs, map the orthogonal sounding channels to the corresponding UE identities, and identify the corresponding UEs. Wherein the UE identities are dedicated connection sequences (DCS), and wherein the orthogonal sounding channels are used by the UEs as sounding reference signals (SRS) to the TPs. Wherein a total number of generated orthogonal sounding channels is larger than a total number of assigned UE identities.

Embodiments provide a network component supporting uplink measurement based operation and control in a wireless network using user equipment (UE) centric sounding signals, the network component comprising: at least one processor; and a computer readable storage medium storing programming for execution by the at least one processor, the programming including instructions to: assign a plurality of UE identities to a plurality of corresponding UEs, the UE identities each uniquely identifying a corresponding UE from the UEs; and generate a plurality of orthogonal sounding channels using the UE identities, the orthogonal sounding channels each uniquely generated using a corresponding UE identity from the UE identities. The network component further comprises maintaining a one-to-one mapping between each of a plurality of orthogonal sequences and the corresponding UE identities. Wherein the one-to-one mapping is shared among a plurality of transmission points (TPs) in a network to enable the TPs to detect the orthogonal sounding channels from the UEs, map the orthogonal sounding channels to the corresponding UE identities, and identify the corresponding UEs. Wherein the UE identities are dedicated connection sequences (DCS), and wherein the orthogonal sounding channels are used by the UEs as sounding reference signals (SRS) to the TPs.

Embodiments provide at a user equipment (UE), a method for enabling device-to-device (D2D) clustering in a wireless network using UE centric sounding signals, the method comprising: receiving, at the UE from the network, one-to-one mapping information indicating a plurality of UE identities (IDs) and a plurality of sounding channels assigned to the corresponding UE IDs; detecting a sounding reference signal (SRS) on an uplink transmission from a second UE from the UEs, the SRS comprising one sounding sequences assigned to the second UE; identifying the second UE using the detected SRS and the one-to-one mapping information; and after receiving the SRS at the UE, communicating with one or more other UEs including the second UE, the network, or combinations thereof to establish D2D clustering for the UE and the second UE. The method further comprises implementing power control for D2D communications with the second UE using signal measurement from the second UE.

Embodiments provide a user equipment (UE) supporting device-to-device (D2D) clustering in a wireless network using UE centric sounding signals, the UE comprising: at least one processor; and a computer readable storage medium storing programming for execution by the at least one processor, the programming including instructions to receive, at the UE from the network, one-to-one mapping information indicating a plurality of UE identities (IDs) and a plurality of sounding channels assigned to the corresponding UE IDs; detect a sounding reference signal (SRS) on an uplink transmission from a second UE from the UEs, the SRS comprising one of sounding sequences assigned to the second UE; identify the second UE using the detected SRS and the one-to-one mapping information; and after receiving the SRS at the UE, communicate with one or more other UEs including the second UE, the network, or combinations thereof to establish D2D clustering for the UE and the second UE.

What is claimed is:

1. A non-transitory computer-readable medium storing computer instructions, that when executed by one or more processors, cause an apparatus to perform operations of:
   receiving, from a transmission point in a cell including a plurality of transmission points, radio resource control (RRC) signaling, the RRC signaling comprising uplink sounding reference signal (SRS) configuration, the uplink SRS configuration comprising configurations of an uplink SRS sequence, time, frequency, periodicity, and a hopping pattern;
   generating the uplink SRS sequence in accordance with the uplink SRS configuration, the uplink SRS sequence being independent from identities of the plurality of transmission points in the cell; and
   transmitting the uplink SRS sequence to different transmission points of the plurality of transmission points in the cell.

2. The non-transitory computer-readable medium of claim 1, wherein the uplink SRS sequence is generated by a base reference signal sequence that is applied with a cyclic shift and an orthogonal code (OC).

3. The non-transitory computer-readable medium of claim 2, wherein the base reference signal sequence is selected based on SRS resource of the apparatus.

4. The non-transitory computer-readable medium of claim 1, wherein the uplink SRS sequence is associated with an apparatus identifier (ID) that uniquely identifies the apparatus in the cell.

5. The non-transitory computer-readable medium of claim 1, the transmitting comprising:
   transmitting the uplink SRS sequence over a channel opportunity, wherein a combination of the uplink SRS sequence in an SRS and the channel opportunity is used to uniquely identify the apparatus by the different transmission points of the plurality of transmission points in the cell.

6. An apparatus, comprising:
   at least one processor; and
   a non-transitory computer readable storage medium storing programming for execution by the at least one processor, the programming including instructions to:
      receive, from a transmission point in a cell including a plurality of transmission points, radio resource control (RRC) signaling, the RRC signaling comprising uplink sounding reference signal (SRS) configuration, the uplink SRS configuration comprising configurations of an uplink SRS sequence, time, frequency, periodicity, and a hopping pattern;
      generate the uplink SRS sequence in accordance with the uplink SRS configuration, the uplink SRS sequence being independent from identifiers of the plurality of transmission points in the cell; and
      transmit the uplink SRS sequence to different transmission points of the plurality of transmission points in the cell.

7. The apparatus of claim 6, wherein the uplink SRS sequence is generated by a base reference signal sequence that is applied with a cyclic shift and an orthogonal code (OC).

8. The apparatus of claim 7, wherein the base reference signal sequence is selected based on SRS resource of the apparatus.

9. The apparatus of claim 6, wherein the uplink SRS sequence is associated with an apparatus identifier (ID) that uniquely identifies the apparatus in the cell.

10. The apparatus of claim 6, the programming including the instructions to transmit the uplink SRS sequence by:
    transmitting the uplink SRS sequence over a channel opportunity, wherein a combination of the uplink SRS sequence in an SRS and the channel opportunity is used to uniquely identify the apparatus by the different transmission points of the plurality of transmission points in the cell.

11. A communication method, comprising:
    receiving, by an apparatus from a transmission point in a cell including a plurality of transmission points, radio resource control (RRC) signaling, the RRC signaling comprising uplink sounding reference signal (SRS) configuration, the uplink SRS configuration comprising configurations of an uplink SRS sequence, time, frequency, periodicity, and a hopping pattern;
    generating, by the apparatus, the uplink SRS sequence in accordance with the uplink SRS configuration, the uplink SRS sequence being independent from identities of the plurality of transmission points in the cell; and
    transmitting, by the apparatus, the uplink SRS sequence to different transmission points of the plurality of transmission points in the cell.

12. The method of claim 11, wherein the uplink SRS sequence is generated by a base reference signal sequence that is applied with a cyclic shift and an orthogonal code (OC).

13. The method of claim 12, wherein the base reference signal sequence is selected based on SRS resource of the apparatus.

14. The method of claim 11, wherein the uplink SRS sequence is associated with an apparatus identifier (ID) that uniquely identifies the apparatus in the cell.

15. The method of claim 11, the transmitting comprises:
  transmitting the uplink SRS sequence over a channel opportunity, wherein a combination of the uplink SRS sequence in an SRS and the channel opportunity is used to uniquely identify the apparatus by the different transmission points of the plurality of transmission points in the cell.

\* \* \* \* \*